United States Patent [19]

Bühl

[11] 4,091,853
[45] May 30, 1978

[54] SCREW-LOCKING DEVICE

[76] Inventor: Peter Bühl, Zeppelinstr 35, 7032 Sindelfingen, Germany

[21] Appl. No.: 676,810

[22] Filed: Apr. 14, 1976

[51] Int. Cl.² .......................................... F16B 39/24
[52] U.S. Cl. .................................................. 151/35
[58] Field of Search .................. 151/35, 37, 34, 36, 151/38

[56] References Cited

U.S. PATENT DOCUMENTS

| 299,987 | 6/1884 | Jordan | 151/35 |
| 813,714 | 2/1906 | Ketcham | 151/35 |
| 1,162,566 | 11/1915 | Bushyeager | 151/35 |
| 2,783,810 | 3/1957 | Wrigley | 151/34 |
| 3,077,218 | 2/1963 | Ziegler | 151/35 |
| 3,329,190 | 7/1967 | Oldenkott | 151/35 |
| 3,389,734 | 6/1968 | Gutshall | 151/37 |
| 3,605,845 | 9/1971 | Junker | 151/37 |
| 3,825,051 | 7/1974 | Sigmund | 151/37 |

FOREIGN PATENT DOCUMENTS

| 1,192,452 | 4/1959 | France | 151/35 |
| 361,206 | 11/1931 | United Kingdom | 151/35 |

Primary Examiner—Ramon S. Britts

[57] ABSTRACT

A screw-locking device has a stamped cup spring with a solid annular core having closely spaced triangular radial ribs top and bottom. The distance from the peaks of the ribs from the center plane of the core continually decreases from the outer rim of the annular spring towards the inner rim.

3 Claims, 14 Drawing Figures

1. SCREWS : M 10 × 40 - 8.8 DIN 912
2.1 MATERIAL : 50 Cr V 4
2.2 HARDNESS 30: 184
2.3 BORE DIA. ∅ : 11,2 mm
2.4 THICKNESS 3,5 mm

3. LUBRICANT : Vaseline
4. TEST FREQ : 12,5 Hz

∴ Nr. 1 WITHOUT TOOTHED DISKS

| Nr. | IDLING AMPL. $\pm S$ [mm] | EFFECT. 1. AMPL. $\pm S_{eff}$ [mm] | INITIAL PRETENS. FORCE $F_{vo}$ [N] | 1ST TIGHTENING TORQUE $M_{A1}$ [Nm] | LOOSENING TORQUE $M_L$ [Nm] | LOOSENED/NOT LOOSENED × LOOSENED ○ NOT LOOSENED | |
|---|---|---|---|---|---|---|---|
| 1 | 0,6 | 0,275 | 26.000 | 39 | 12 | × | FKR = 37 % +) |
| 2 | 0,6 | 0,25 | 26.000 | 43 | 8 | × | FKR = 20 % |
| 3 | 0,6 | 0,26 | 26.000 | 40 | 7 | × | FKR = 23 % |
| 4 | 0,5 | 0,24 | 26.000 | 40 | 13 | × | FKR = 43 % |
| 5 | 0,5 | 0,22 | 26.000 | 39 | 8 | × | FKR = 34 % |
| 6 | 0,5 | 0,22 | 26.000 | 40 | 4 | × | FKR = 24 % |
| 7 | 0,4 | 0,15 | 26.000 | 43 | 36 | ○ | FKR = 98 % |
| 8 | 0,4 | 0,15 | 26.000 | 38 | 34 | ○ | FKR = 97 % |
| 9 | 0,4 | 0,15 | 26.000 | 38 | 34 | ○ | FKR = 97 % |
| 10 | 0,45 | 0,20 | 26.000 | 38 | 19 | × | FKR = 65 % |
| 11 | 0,45 | 0,19 | 26.000 | 38 | 33 | ○ | FKR = 94 % |
| 12 | 0,45 | 0,19 | 26.000 | 37 | 33 | ○ | FKR = 93 % |
| 13 | 0,45 | 0,20 | 26.000 | 39 | 35 | ○ | FKR = 93 % |
| 14 | 0,45 | 0,19 | 26.000 | 36 | 32 | ○ | FKR = 97 % |
| | | | $M_{A1\ min.}$ | 36 | | | |
| | | | $M_{A1\ max.}$ | 43 | | | |
| | | | $M_{A1}$ | 39,1 | | | |
| | | | S | 1,99 | | | |

+) FKR = RESIDUAL PRETENSIONAL FORCE AFTER TEST

FIG. 8

1. SCREWS : M 10 x 40 - 8.8 DIN 912
2.1 MATERIAL : 50 Cr V 4
2.2 HARDNESS HV 30: 184
2.3 BORE DIA. -⌀: 11,2 mm
2.4 THICKNESS: 3,5 mm

3. LUBRICANT : Vaseline
4. TEST FREQ. : 12,5 Hz

Nr. 2  TOOTHED DISK A

| Nr. | IDLING AMPL. $\pm S_L$ [mm] | EFFECT. 1. AMPL. $\mp S_L$ eff [mm] | INITIAL PRETENS. FORCE $F_{vo}$ [N] | 1.TIGHTENING TORQUE $M_{A1}$ [Nm] | LOOSENING TORQUE $M_L$ [Nm] | x LOOSENED  o NOT LOOSENED | |
|---|---|---|---|---|---|---|---|
| 1 | 0,5 | 0,24 | 26.000 | 40 | 40 | o | FKR+) = 92 % |
| 2 | 0,5 | 0,22 | 26.000 | 41 | 39 | o | FKR = 90 % |
| 3 | 0,5 | 0,20 | 26.000 | 39 | 23 | o | FKR = 91 % |
| 4 | 0,6 | 0,29 | 26.000 | 40 | 0 | x | FKR = 3 % |
| 5 | 0,6 | 0,30 | 26.000 | 40 | 0 | x | FKR = 0 |
| 6 | 0,6 | 0,27 | 26.000 | 41 | 0 | x | FKR = 0 |
| 7 | 0,6 | 0,28 | 26.000 | 38 | 0 | x | FKR = 8 % |
| 8 | 0,6 | 0,30 | 26.000 | 42 | 0 | x | FKR = 0 |
| 9 | 0,55 | 0,26 | 26.000 | 44 | 36 | o | FKR = 83 % |
| 10 | 0,55 | 0,26 | 26.000 | 40 | 39 | o | FKR = 88 % |
| 11 | 0,55 | 0,27 | 26.000 | 38 | 0 | x | FKR = 0 |
| 12 | 0,55 | 0,24 | 26.000 | 43 | 37 | o | FKR = 87 % |
| 13 | 0,55 | 0,26 | 26.000 | 39 | 0 | x | FKR = 11 % |
| | | | $M_{A1\,min.}$ | 38 | | | |
| | | | $M_{A1\,max.}$ | 44 | | | |
| | | | $M_{A1}$ | 40,5 | | | |
| | | | S | 1,81 | | | |

+) FKR = RESIDUAL PRETENSIONAL FORCE AFTER TEST

FIG. 9

1. SCREWS : M 10 x 40 - 8.8 DIN 912
2.1 MATERIAL : 50 Cr V 4
2.2 HARDNESS HV 30: 184
2.3 BORE DIA. ⌀ : 11,2 mm
2.4 THICKNESS : 3,5 mm

3. LUBRICANT : Vaseline
4. TEST FREQUENCY 12,5 Hz

: Nr. 3 TOOTHED DISK B

| Nr. | IDLING AMPL. $\pm S_L$ [mm] | EFFECT. 1. AMPL. $\pm S_L$ eff [mm] | INITIAL PRETENS. FORCE $F_{vo}$ [N] | 1. TIGHTENING TORQUE $M_{A1}$ [Nm] | LOOSENING TORQUE $M_L$ [Nm] | x LOOSENED  o NOT LOOSENED |
|---|---|---|---|---|---|---|
| 1 | 0,55 | 0,24 | 26.000 | 40 | 40 | o  +) FKR = 90 % |
| 2 | 0,55 | 0,24 | 26.000 | 40 | 39 | o  FKR = 85 % |
| 3 | 0,55 | 0,25 | 26.000 | 43 | 40 | o  FKR = 92 % |
| 4 | 0,55 | 0,25 | 26.000 | 40 | 42 | o  FKR = 89 % |
| 5 | 0,55 | 0,24 | 26.000 | 40 | 0 | x  FKR = 0 |
| 6 | 0,60 | 0,27 | 26.000 | 40 | 0 | x  FKR = 0 |
| 7 | 0,60 | 0,31 | 26.000 | 40 | 0 | x  FKR = 0 |
| 8 | 0,60 | 0,27 | 26.000 | 40 | 0 | x  FKR = 0 |
| 9 | 0,60 | 0,27 | 26.000 | 38 | 0 | x  FKR = 0 |
| 10 | 0,60 | 0,27 | 26.000 | 42 | 45 | o  FKR = 87 % |
| 11 |  |  |  |  |  |  |
| 12 |  |  | $M_{A1}$ min. | 38 |  |  |
| 13 |  |  | $M_{A1}$ max. | 43 |  |  |
| 14 |  |  | $M_{A1}$ | 40,3 |  |  |
|  |  |  | S | 1,34 |  |  |
|  |  |  |  |  |  |  |
|  |  |  |  |  |  |  |
|  |  |  |  |  |  |  |

+) FKR = RESIDUAL PRETENSIONAL FORCE AFTER TEST

FIG. 10

|  | Nr. | $M_A$ | $M_L$ | $\frac{M_L}{M_A}$ | X |
|---|---|---|---|---|---|
| WITHOUT LOCKING | 1 | 40 | 26,4 | 0,66 | |
| | 2 | 45,2 | 31,6 | 0,70 | |
| | 3 | 49,6 | 34,4 | 0,69 | 0,68 |
| | 4 | 44,8 | 30 | 0,67 | |
| | 5 | 44,4 | 30 | 0,68 | |
| Ⓐ | 1 | 49,6 | 34,8 | 0,70 | |
| | 2 | 49,2 | 35,2 | 0,72 | |
| | 3 | 51,6 | 36,4 | 0,71 | 0,72 |
| | 4 | 51,6 | 36 | 0,70 | |
| | 5 | 50,4 | 38,8 | 0,77 | |
| Ⓑ | 1 | 46,8 | 36 | 0,77 | |
| | 2 | 48 | 37,4 | 0,78 | |
| | 3 | 47,2 | 39,2 | 0,83 | 0,77 |
| | 4 | 49,6 | 34,8 | 0,70 | |
| | 5 | 47,2 | 36 | 0,76 | |

FIG. 14

SCREW-LOCKING DEVICE

The present invention relates to a screw-locking device in the form of a stamped cup spring of spring metal, with solid annular core region comprising an outer rim, an inner rim, a topside and a bottom side, with approximately radial ribs arranged close to one another at regular intervals, which ribs are of approximately triangular cross section and are provided both on the topside and on the bottom side at least in parts of these areas.

There are approximately 10,000 types of screw-locking devices. The type of screw-locking device in accordance with the present invention is to be found in that field of application where defined durability is important. Such fields are, e.g., machine construction, vehicle construction and engine construction. This is in contrast with connections whose only requirement is that they hold, e.g., furniture, lamps, toys, etc.

Typical for the screw-locking device in accordance with the present invention is its application on structural elements which are exposed to low-frequency vibrations, with these vibrations tending to shift the design elements in relation to one another.

It is typical of the screw-locking device in accordance with the present invention that the circumstances of its application are only defined to a limited extent. Such a screw-locking device must meet the expected requirements, whether the facing surface is the underside of a screwhead or a nut, whether the other facing surface is part of a rotating or a stationary part, whether the bore belonging to the other part is heavily or slightly countersunk or not countersunk at all, or whether the roughness of facing surfaces has the desired value or deviates greatly therefrom. Even when the geometric longitudinal axis of the through-hole is not exactly parallel to the geometric longitudinal axis of the screw or the bolt or when these two longitudinal axes are parallel but do not coincide, the screw-locking devices in accordance with the present invention must meet their requirement.

Cup springs of this type are being manufactured by the billions and thus are a mass produced item. Solutions to the problem which are successful only with handmade locknuts, therefore, remain paper inventions. The design of the screw-locking device must be such that, in spite of the fading quality of the stamping and punching tools, a good result is obtained, because it is economically impossible to permit excessively high down times for such tools.

Therefore, screw-locking devices of this type, in manufacture, purchase and application, are not evaluated according to viewpoints relating to a single piece. Rather, it is typical that their properties are evaluated according to the Gaussian standard distribution, i.e., for example, 10% of the screw-locking devices may be better and 10% may be worse than the required mean value.

During assembly, the screwheads or nuts are tightened with a certain torque, e.g., in the neighborhood of 40 Nm. This torque is furnished manually via torque wrenches or with machine devices with adjustable torque. The defined durability of the connection is determined by the so-called loosening torque. If, for example, the tightening wrench applied 40 Nm and the loosening torque is only 20 Nm, such a loosening torque may possibly be too low. A stronger screw or or a stronger bolt is required in order to tighten with, e.g., 60 Nm so that 30 Nm remain as the necessary loosening torque.

It must be pointed out that with the loosening torque the problem is not the delivery of maximum resistance to a wrench which is to loosen the connection. Rather, this loosening torque is the torque remaining after a certain period of use of the structural element. Of course, this torque is measured by loosening the connection with a torque-indicating instrument.

A screw connection pulls two parts together with a certain tensional force, and this tensional force should remain as high as possible during the lifetime of the design element. It would be best if the tensional force could be maintained at 100%, and worst if only 0% would remain. In this analysis it must be noted that in actual application 0% residual bias force is better than, e.g., 60% residual bias force, because this residual pretensional force, in a grey zone, is not noticeable from the outside. It is, therefore, better if the connection either holds properly or does not hold at all. If, e.g., the residual pretensional force is 10%, one might think that the connection is still intact, which is wrong. However, if the connection is loose (residual pretensional force 0%), the connection can be replaced.

It is, therefore, an object of the present invention to provide a screw-locking device of the initially mentioned type with due allowance for the above considerations, which is inexpensive to manufacture in very large quantities, has forms which permit a tolerable shutdown time for the tools and has a high ratio of loosening torque to tightening torque and holds this torque in operation or does not hold it all. These requirements should be viewed in the light of statistics.

The objects of the present invention are achieved as follows: Perpendicular to the center plane of the core region, the distance of the tips of the ribs from the center plane in the outer rim area is appreciably greater than the distance in the inner rim area and that this distance continually decreases from the outer rim area towards the inner rim area. As a result, the peaks grab a complete hold only when the screw-locking device has been almost flattened.

By means of the improvements of claim 2, the ratio of loosening torque to tightening torque is considerably improved.

By means of the improvements of claim 3, the tool manufacture becomes simple and the fastening conditions on the topside and on the bottom side become symmetrical, so that topside and bottom side become equally stressed.

Such a screw-locking device need not have free edges as required by German Pat. No. 1 129 779. This would not only result in higher manufacturing costs, but would also destroy the effect of the invention to the extent that the free edge is in the outer rim area.

The invention is being described by the example of preferred embodiments.

FIGS. 8 through 10 show test sheets for the dynamic case;

FIGS. 8 through 13 show curves for tightening torques and loosening torques for the static case; and FIG. 14 shows a tabulation of the results of FIGS. 11 through 13.

Figure 1:
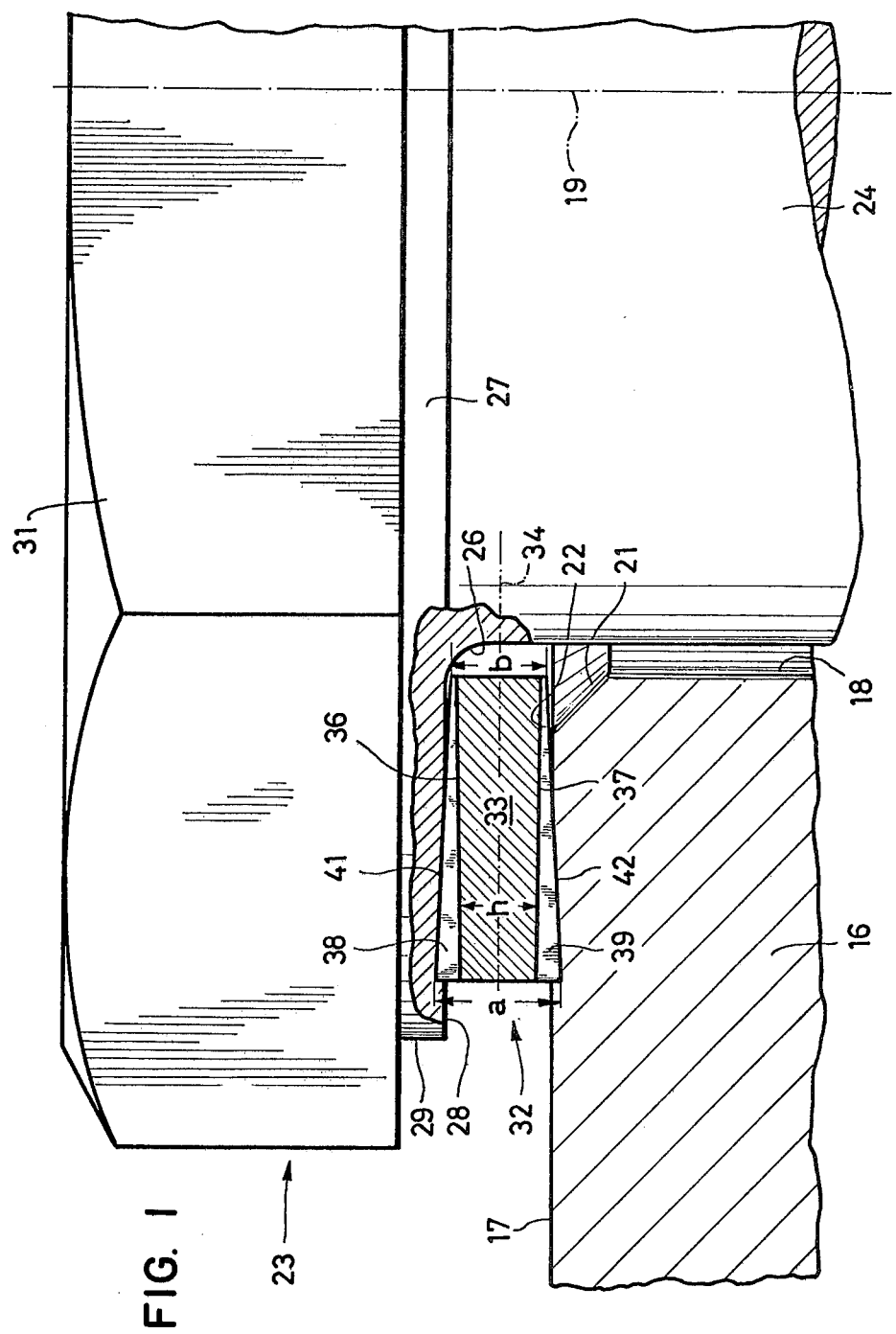
FIG. 1 shows an enlarged partial section in the area of a screwbolt head with lockwasher and flat washer.

A metal component 16 has in its topside 17 a through-bore 18. The through-bore 18 has a geometric longitudinal axis 19 and on its topside has a countersink 21 with an outer rim 22 which becomes part of topside 17.

A bolt 23 has a shank 24 of circular cross section whose geometric longitudinal axis is axis 19. With a radius 26, shank 24 turns into an annular plateau 27 which has a plane underside 28 and an outer rim 29. The outer rim 29 joins head 31 which is hexagonal.

Figure 3:
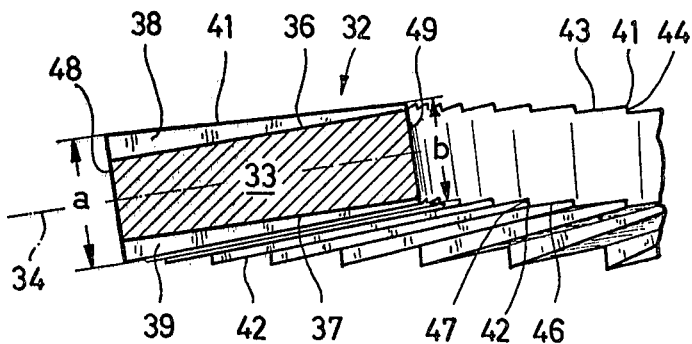
FIG. 3 shows a radial broken section through a relieved lockwasher.

Between topside 17 and underside 28 is a lockwasher 32 which is in its stressed position and in the unstressed condition has the shape of a cup spring. The core region 33 is solid. Its height $h$ is the same throughout and hence symmetrical to the center plane 34. At its topside 36 and its underside 37, the core region turns into upper ribs 38 and lower ribs 39. Each rib has a continuous ridge 41, 42. This ridge 41, 42 continuously drops from the outer rim to the inner rim of lockwasher 32, preferably in linear fashion, so that distance $a$ is greater than distance $b$. The upper ribs 28 are sawtooth-shaped. According to FIG. 3, the flat flange 43, increasing to the right, turns into the steep flank 44, which in actual practice, or at least with older tools, is probably not vertical but flatter than drawn in the illustration.

The lower ribs 39 have the same shape as the upper ribs 38. However, here the flat flange 46 turns via ridge 42 to the left into the flange 47 belonging to this rib 39. These forms apply for the standard right-handed screws and nuts. If they are left-handed, the shape of ribs 38, 39 must be inverted. Hence, the lockwasher 32 in the area of the outer rim 48 has greater thickness than in the area of inner rim 49.

Statically, during usage, when the bolt 23 is tightened, the point formed by the outer rim 48 and the ridges 42 will come in contact with topside 17. At the same time, the point formed between ridges 41 and inner rim 49 comes into contact with the underside 28. However, since the radial distance of the former points from the longitudinal axis 19 is greater than the second-mentioned points, the lockwasher 32 is not being turned. The ridges 42 can dig very quickly into the topside 17. When the lockwasher 32 is flat at the time of maximum torque, the ridges 41, 42 will have dug into topside 17 and underside 28. The closer the outer rim 48 is approached, the deeper the ridges 41, 42 have dug in and the more favorable the torque radius for the loosening torque becomes.

This design ensures that the lockwasher 32 does not search for support where it finds none, namely in the countersink 21. Even when the lockwasher 32 is not in as ideal a position as indicated in FIG. 1, still the danger of digging into radius 26 is reduced. Radius 26 is located unfavorably from a torque viewpoint and represents a point of high specific stress. If the lockwasher 32, by mistake is installed with its topside 36 downward, the same effect of the present invention results. If a lockwasher 32 were chosen where the outer rim 48 is outside outer rim 29, the invention would still make sense: Always the extremely outward areas of ridges 41, 42 would be used for generating a counter torque.

Another good feature of the invention is that the forces are conducted along the shortest path through the lockwasher 32. The points formed by the outer rim 48 and ridges 41, 42 lie — when they do not coincide — directly underneath one another so that the principal forces travel along the shortest path, i.e., perpendicularly through the core region 33. They do not pass diagonally through the core region 33. Such forces would squeeze and unfavorably deform the lockwasher 32 and increase the danger of breaking.

Since the envelope of lockwasher 32 is wedge-shaped, it makes little difference if, e.g., near the radius 26 or near the outer radius 22 the underside 28 or the topside 17 are extremely rough or do not run parallel to each other, or have surface protective layers of great thickness (e.g., when they are hot-galvanized). FIG. 2 again shows the component 16 with through-bore 18, countersink 21 and outer rim 22 and topside 17. The drawing shows that the lockwasher 32 in accordance with the present invention may also be used with a threaded bolt 51 and a nut 52 threaded unto it. To be sure, there is no radius 26. However, at the point of transition from threaded boltbolt 51 to nut 52 there may occur discontinuities at the underside 53 which are made harmless by the design of the lockwasher 32 and cannot be the cause of the inner rim 49 being pressed down into countersink 21. The material of the lockwasher 32 would become overloaded and cracks would possibly develop in the inner rim. The same also applies to the conditions of FIG. 1.

Figure 2:
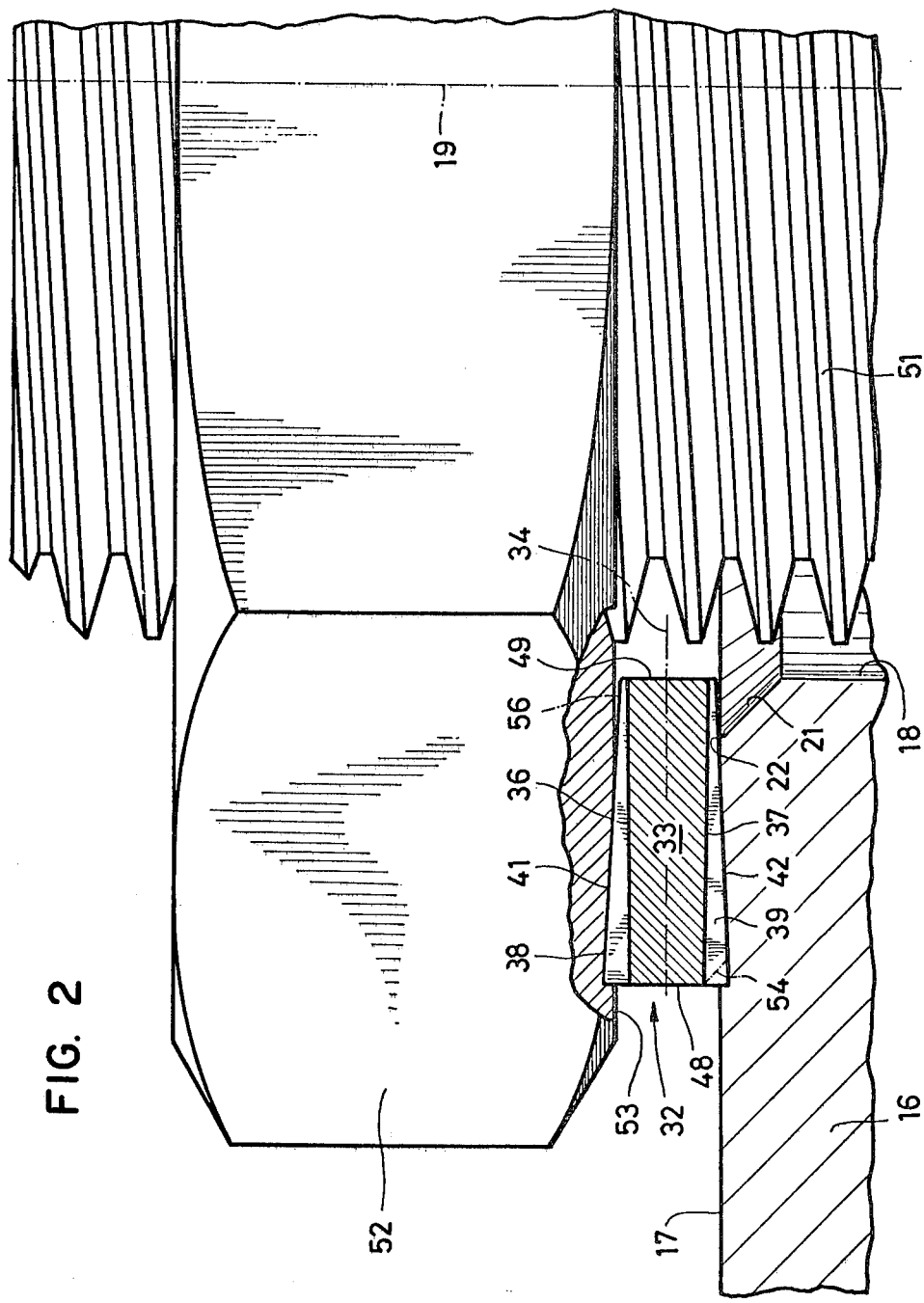
FIG. 2 shows a similar arrangement near a nut.

FIG. 2 also shows that the ribs 38, 39 must not necessarily have affine cross sections. Rather, chamfers 54 or 56 may be provided. However, care must be taken that the forces pass directly through lockwasher 32. Deviations of 10° from the vertical towards the center plane have no appreciable effect.

Figure 4:
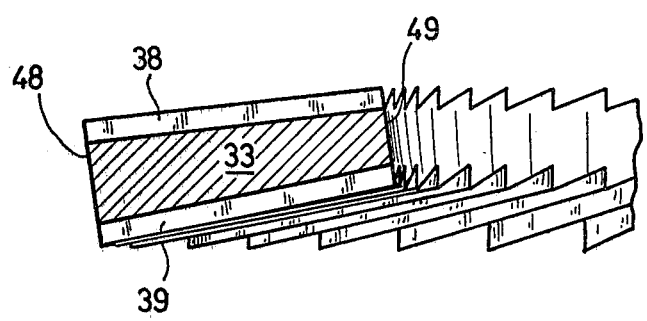
FIG. 4 shows a section similar to FIG. 3 for a second embodiment.

In the embodiment of FIG. 4, the core region 33 does not have a rectangular cross section, but becomes narrower towards the inside. Since the core region 33 becomes thinner towards the inside the same way as the envelope, the ribs 38, 39 throughout their entire length are of coincident shape. This shape does not lend itself not quite as easily to stamping as a cross section of FIG. 3 because during stamping more material must be displaced. However, the embodiment has the advantage that the free volume of the valleys between the ribs is greater and unevennesses of the adjacent components are better accommodated in the direction towards the inner rim 49. With this embodiment, too, the ribs 38, 39 have sawtooth shape. With not quite so good results, it is also possible to modify the sawtooth shape into a isosceles triangle.

Figure 5:
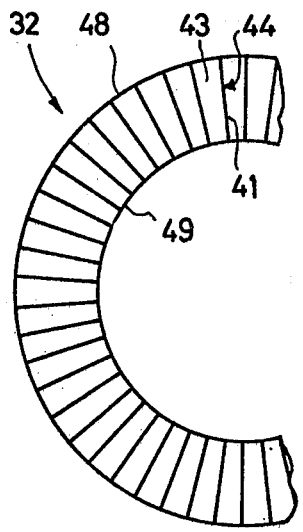
FIGS. 5 through 7 show broken top views of various types of lockwashers.

In accordance with FIG. 5, the ridges 41 are precisely radial and straight. This is the simplest manufacturing version which brings good results.

Figure 6:
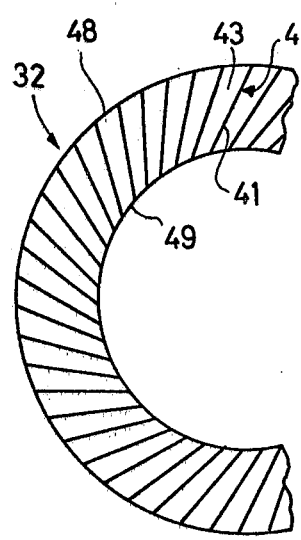

According to FIG. 6, the ridges are straight, but run somewhat tangentially.

Figure 7:
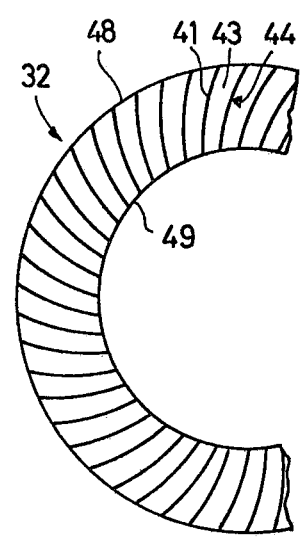

According to FIG. 7, the ridges 41 are curved in the manner shown, which gives the best results, but presents the largest difficulties in the manufacture of the stamping die.

So that the load on the lockwasher is symmetrical, it is recommended to use identical rib forms on both sides.

In practice, ridges 41, 42 cannot be made as sharp as a knife's edge. However, the invention is effective also when these ridges 41, 42 are rounded off, as long as they still constitute ridges.

During the experiments described below, one used two plates which were ground on both sides and conformed to items 2.1 through 2.4. One of these plates was held tight and the other plate (e.g., component 16) was vibrated. After each experiment, the plates, the screwbolts and also the lockwashers were replaced. Ground plates represent aggravated experimental conditions since such low roughness impairs the effect of lockwashers. Lubrication with vaseline also represents an aggravation, since normally the design elements are not lubricated. The test frequency of 12.5 Hz also is a difficult frequency. Above all, during preliminary experiments, attempts were made to find vibration amplitudes where the loosening of connections occurs earliest.

Both tightening and vibration experiments were made in the vibration test device "Unbrako." During the assembly of the screwbolt, the tightening torque $M_{Al}$ was measured. After the subsequent vibration test, the torque $M_L$ required for loosening the screw was determined. Both torques, together with the behavior of the pretensional force reduction ($F_v$) were recorded on the same graph paper by means of an XY recorder. All screwbolts were pretensioned to an initial pretensional force $F_{vo}$ of 70% of the standardized yield strength. The plates were of material 50 Cr V 4. Their hardness was HV 30 = 184. The experiments were carried out with fillister socket head screws M 10 × 40 − 8.8 DIN 912. The screws were from one manufactured batch. Altogether, three test series were performed: Series 1 without toothed disk (FIG. 8); series 2 with toothed disks, design A according to German Pat. No. 1 129 779; and series 3 with lockwashers of Design B (shape of FIGS. 3 and 5). The idling amplitude was obtained as the amplitude of the movable plate, without the two plates screw-fastened to one another. Immediately after screw-fastening, an effective first amplitude is obtained. Hence, the ratio of the effective first amplitude to the idling amplitude is important.

After screw-fastening, a certain effective amplitude resulted. The initial pretensional force in all experiments was 26,000 N. To generate this pretensional force, the stated tightening torque $M_{Al}$ was necessary. The loosening moment $M_L$ states which torque was necessary to loosen the connection after the vibration test. In the extreme right-hand column, an x denotes the connection which must be considered loosened and an o denotes the non-loosened connections. Also, $F_{KR}$ denotes the residual pretensional force after the experiment.

In the evaluation, it should be noted that the maximum tightening torque $M_{Al}$ at one time is 36 Nm and the next time 43 Nm, which gives a mean tightening torque of 39.1 and a standard deviation s of 1.99.

When comparing the columns "tightening moment" and "loosening torque," it appears that none of the loosening torques is equal (or exceeds) the tightening torque, and that most loosening torques are clearly lower than the tightening torques.

Of those connections which must be considered as loosened, many are in the grey zone and they do not appear to have actually been loosened.

Comparing FIG. 9 with FIG. 10, one finds that the standard deviation s for the tightening torques equals 1.34 and hence is considerably below the standard deviation 1.81 for known lockwashers.

When comparing the columns "tightening torque" and "loosening torque," it appears that according to FIG. 10 that the loosening torques more frequently approach the tightening torques, and even exceed them in the case of Nos. 4 and 10.

Finally, it appears that in FIG. 10 at a much higher percentage of cases, the residual pretensional force $F_{KR}$ is either still there in its entirety or has dropped to zero, so that the quality of connection can easily be seen by inspection. There is virtually no grey zone.

Figure 11:
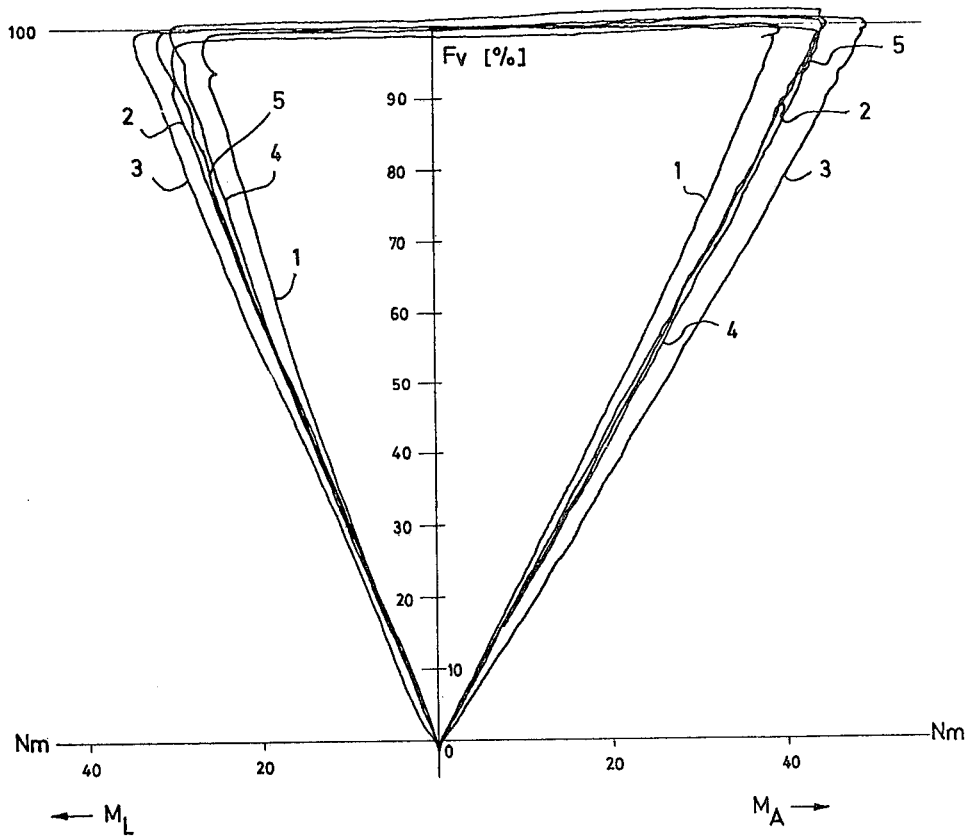
Figure 12:
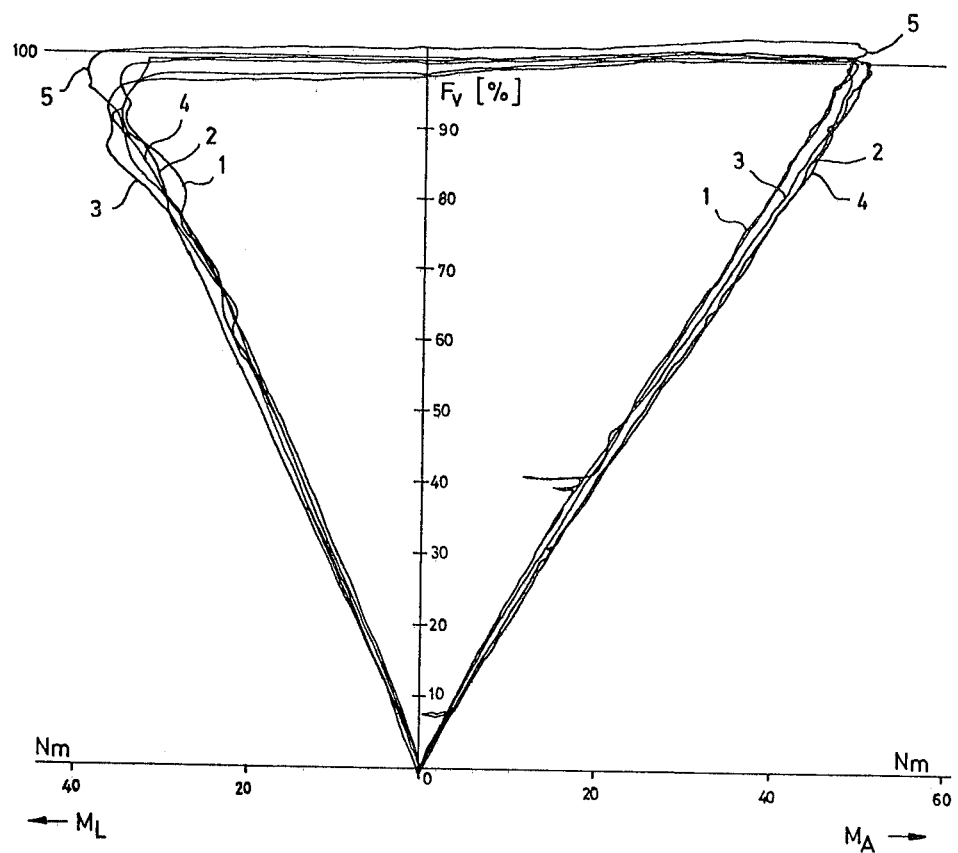
Figure 13:
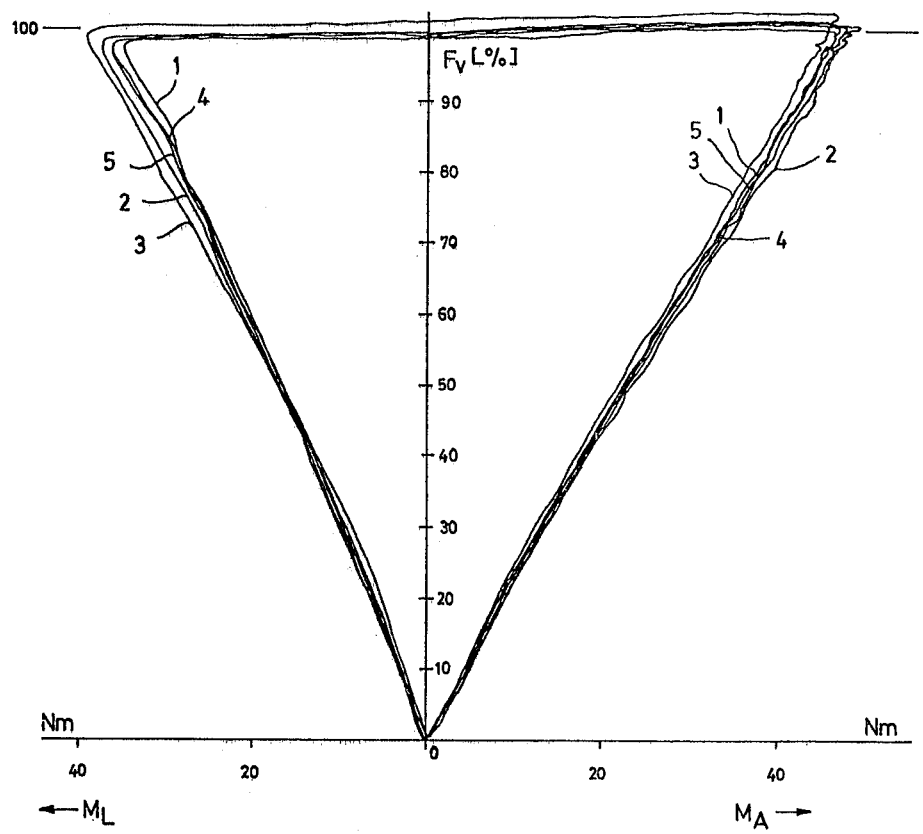

Even through the lockwasher of the present invention is intended for dynamic loads, it shows above-average results for static loads also. In FIGS. 11, 12 and 13, the pretensional force $F_v$ is plotted in percent in the vertical direction. As in FIGS. 8 through 10, 100 percent correspond to 26,000 N. In the right-hand direction, tightening torque $M_A$ is plotted in Nm and in the left-hand direction the loosening torque $M_L$ is plotted on the same scale. Numbers from 1 through 5 on the curves show which curve belongs to which experiment. FIG. 11 shows the conditions without lockwasher. With the experiment according to FIG. 12, a lockwasher according to German Pat. No. 1 129 779 and with FIG. 13 a lockwasher in accordance with the present invention was used; the lockwasher has the shape of FIGS. 4 and 5.

Even at first glance it is apparent that in FIG. 11 upper left, the loosening torque on the average is much smaller than with FIG. 12. In addition, comparing FIG. 13 with FIG. 12, with FIG. 12 the pretensional force $F_v$ can be set more definitely, since the horizontal lines are closer to 100%; on the other hand, on the average the loosening torque with FIG. 13 is higher and, especially with FIG. 13, the curve irregularity evident in FIG. 12 on the upper left side does not occur. This means that with the lockwasher in accordance with the present invention, much better defined and more predictable conditions can be achieved.

Considering the numerical evaluation of these three experiments in FIG. 14, one finds that the ratio of loosening torque to tightening torque increases from case A = 0.72 to 0.77, which in this area is a sudden increase of 7%, which is more than the increase from 0.68 to 0.72. The latter is only 5.9%. During the first experiment, the mean tightening torque is 44.8, in case A 50.5 and in case B 47.76. For the loosening torque, mean values of 30.48, 36.2 and 36.7 result in the same sequence. It is evident that in case B the tightening torque is 5.4% lower than in case A, and that, nevertheless, the loosening torque is slightly more than 1% higher. These percentages are considerable for this highly explored field of application.

What is claimed is:

1. A screw-locking device comprising a stamped cup spring of the Belleville type of spring metal having a solid annular core region of substantially frusto-conical configuration with an outer rim, an inner rim, a top side, a bottom side and approximately radial ribs arranged close to one another at regular intervals on at least a portion of both the top side and the bottom side, which ribs are of approximately triangular cross section,
    the cross section of the core region having a center plane,
    perpendicular to the center plane of the core region, the distance of the peaks of the ribs from the center plane in the area of the outer rim is appreciably greater than the distance in the area of the inner rim and this distance continually decreases from the outer rim area towards the inner rim area,
    the ribs extending to the outer rim to provide the highest portions of the device relative to the center plane in the area of the outer rim
    at least a portion of the ribs on the top side lying approximately above the ribs on the bottom side, at least in the area of the outer rim.

2. A locking device according to claim 1 in which the triangular shape of the ribs is a saw-tooth shape and in which the saw-teeth of the top side have a sense of direction which is opposite to the sense of direction of the bottom side.

3. A locking device according to claim 1 in which the form of the sawteeth on the top side and on the bottom side is approximately the same.

* * * * *